United States Patent [19]

Papay et al.

[11] Patent Number: 4,505,834
[45] Date of Patent: Mar. 19, 1985

[54] LUBRICATING OIL COMPOSITIONS CONTAINING GRAFT COPOLYMER AS VISCOSITY INDEX IMPROVER-DISPERSANT

[75] Inventors: Andrew G. Papay, Manchester; Joseph P. O'Brien, Kirkwood, both of Mo.

[73] Assignee: Edwin Cooper, Inc., St. Louis, Mo.

[21] Appl. No.: 201,515

[22] Filed: Oct. 27, 1980

[51] Int. Cl.$^3$ .............................................. C10M 1/32
[52] U.S. Cl. .............................. 252/51.5 A; 525/285; 525/301; 525/381; 525/382; 525/386
[58] Field of Search .................. 252/51.5 A; 525/285, 525/301, 381, 382, 386

[56] References Cited

U.S. PATENT DOCUMENTS

| | | | |
|---|---|---|---|
| 3,219,666 | 11/1965 | Norman et al. | 252/51.5 A X |
| 3,235,503 | 2/1966 | de Vries | 252/51.5 A |
| 4,089,794 | 5/1978 | Engel et al. | 252/51.5 A |
| 4,137,185 | 1/1979 | Gardiner et al. | 252/51.5 A X |
| 4,160,739 | 7/1979 | Stambaugh et al. | 252/51.5 A X |
| 4,161,452 | 7/1979 | Stambaugh et al. | 252/51.5 A X |
| 4,169,063 | 9/1979 | Kiousky | 252/51.5 A |
| 4,171,273 | 10/1979 | Waldbillig et al. | 252/51.5 A |
| 4,219,432 | 8/1980 | Girgenti et al. | 252/51.5 A |
| 4,235,731 | 11/1980 | Kiousky | 252/51.5 A |

*Primary Examiner*—Andrew Metz
*Attorney, Agent, or Firm*—Donald L. Johnson; John F. Sieberth; W. G. Montgomery

[57] ABSTRACT

Lubricating oil dispersant VI improvers are made by grafting maleic anhydride to an ethylene/α-olefin-nonconjugated diene terpolymer in a hydrogen-treated mineral oil solvent using a free radical and then reacting the grafted intermediate with an amine containing only one primary amine group, 1-6 amino nitrogen atoms and 20-36 carbon atoms.

16 Claims, No Drawings

LUBRICATING OIL COMPOSITIONS CONTAINING GRAFT COPOLYMER AS VISCOSITY INDEX IMPROVER-DISPERSANT

BACKGROUND

Hydrocarbon substituted succinimides have long been used as lubricating oil dispersants. Such succinimides can be represented by U.S. Pat. Nos. 3,172,892, 3,202,678 and 3,219,666.

More recently, succinic groups have been grafted to high molecular weight olefin copolymers and then amidated to form dispersants having viscosity improving properties. Such products are represented by U.S. Pat. Nos. 3,235,503, 3,513,095, 4,089,794 and 4,219,432.

SUMMARY

According to the present invention, new ashless dispersant-viscosity index (VI) improvers are made by grafting succinic groups to an ethylene/α-olefin copolymer and amidating the grafted succinic groups with an amine having only one primary amine group and containing 1-6 amino nitrogen atoms and 1-40 carbon atoms. The grafting step is carried out in hydrogen-treated mineral oil solvent such as hydrocracked mineral oil.

DESCRIPTION OF PREFERRED EMBODIMENTS

A preferred embodiment of the invention is an oil-soluble dispersant having viscosity index improving properties suitable for use in lubricating oil, said dispersant being a product made by a process comprising (a) dissolving an ethylene/α-olefin copolymer having an average molecular weight of about 1000-500,000 in a hydrogen-treated mineral oil, (b) reacting the copolymer solution with maleic acid, anhydride or acid-ester in the presence of a free radical-producing catalyst, thereby grafting succinic groups to said copolymer to form an intermediate, and (c) reacting said intermediate with an aliphatic hydrocarbyl amine containing one primary amine group, 1-6 amino nitrogen atoms and about 1-40 carbon atoms in an amount sufficient to provide at least about one primary amine group for each of said succinic groups.

The ethylene/α-olefin copolymers used in making the products are known compositions in that they are high molecular weight polymers made by polymerizing a mixture of ethylene and α-olefin using a Zeigler-Natta type catalyst. These polymers and procedures for making them are described in U.S. Pat. Nos. 3,522,180, 3,551,336 and 3,598,738 which are incorporated herein by reference. Preferred catalyst for making the polymers contain alkyl aluminum halides, (e.g. diethylaluminum chloride), and vanadium (e.g. vanadium oxychloride or tributyl vanadate). Such polymers have average molecular weights, $\overline{M}n$, in the range of 1000-500,000. A more preferred molecular weight range is 10,000-100,000. Such terpolymers are rubber-like materials which are soluble in hydrocarbon solvents.

The α-olefins used in making the copolymers include those containing from 3 to about 12 carbon atoms such as propylene, butene-1, isobutene, pentene, 2-ethyl-hexene-1, dodecene-1, and the like. The most preferred α-olefin is propylene.

The copolymers preferably contain about 30-80 weight percent ethylene units and 20-70 weight percent olefin units. Optionally, the copolymer can be made using ethylene, an α-olefin and a non-conjugated diene. Since the inclusion of the non-conjugated diene is not essential, the range for units derived from non-conjugated dienes is 0 to about 10 weight percent. When non-conjugated dienes are included, they are preferably present in an amount of 1-10 weight percent based on the weight of the copolymer.

The non-conjugated diene contains about 5-15 carbon atoms. Representative non-conjugated dienes include 1,4-hexadiene, 1,5-hexadiene, 1,5-cyclooctadiene, 1,4-pentadiene, 2-methyl-1,5-hexadiene, dicyclopentadiene, methylene norbornene, 2,4-dimethyl-2,7-octadiene, ethyl norbornadiene, and the like. The most preferred non-conjugated diene is 1,4-hexadiene alone or in combination with a bicyclic diene such as ethylidene norbornene or dicyclopentadiene.

The molecular weight of the copolymer can be controlled by applying hydrogen pressure as described in U.S. Pat. No. 3,051,690. Optionally, the molecular weight of a very high molecular weight polymer may be adjusted down by subjecting the polymer to mechanical shear.

Grafting of succinic groups to the copolymer is carried out by heating a solution of the copolymer with a succinic precursor and a free radical-producing catalyst. Suitable succinic precursors are maleic acid, maleic anhydride, maleic acid-esters, preferably the lower $C_{1-5}$ alkyl esters, such as methyl, ethyl, isopropyl, n-propyl, isobutyl, n-butyl, n-pentyl, and the like. The preferred succinic precursor is maleic anhydride.

The amount of maleic acid, anhydride or ester should be at least one mole per mole of olefin copolymer. In most cases, this is provided by mixing 0.01 to 50 weight percent maleic acid, anhydride or ester into the copolymer solution. More preferably the amount of maleic reactant is 0.02 to 10 weight percent based on the weight of the copolymer. When lower molecular weight copolymer (e.g. 1000-10,000) are used, then a higher amount of maleic compound is required to achieve the one mole per mole of copolymer.

Although not preferred, it might be possible to make substantially the same grafted products in substantially the same way by reacting the maleic reactant initially with the amine reactant to obtain an ammonium salt, amide or imide and then graft this intermediate to the olefin copolymer. Such products are equivalents.

Only a small amount of the free radical-producing catalyst is required. A useful range is from about 0.2 to about 10 weight percent based on the weight of the olefin copolymer. The free radical catalyst can be added all at the start of the graft reaction or periodically during the course of the reaction.

The graft reaction is carried out at elevated temperatures. The temperature should be high enough to cause the reaction to proceed but not so high as to cause decomposition of the reactants or products. In general, it should be conducted at the temperature at which the particular free radical-producing catalyst is known to form free radicals. This will be dependent somewhat on the catalyst being used. A useful temperature range in which to work is about 140° C. to about 200° C.

A wide variety of free radical-producing catalyst can be employed. Such catalysts are well known in the art. Representative examples of free radical-producing catalysts include peroxides, hydroperoxides and azo-compounds such as di-tert-butylperoxide, benzoylperoxide, tert-butyl perbenzoate, azobutyronitrile, dicumylperoxide, 2,5-dimethyl-hex-3-yne-2,5-bis-tert-butylperoxide, 2,5-dimethylhexane-2,5-bis-tert-butylperoxide.

The grafting is carried out by dissolving the copolymer in hydrogen-treated mineral oil, adding the maleic reactant and free radical-producing catalyst and heating the mixture to an elevated temperature. In general, the oil solution will contain about 1–15 weight percent copolymer. Heating the oil to about 100°–250° C. under a nitrogen atmosphere helps form the solution. Use of hydrogen-treated mineral oil as a reaction medium is very important. Hydrotreating lowers the unsaturate content of the oil so that grafting of the maleic compound occurs mainly on the copolymer. Hydrogen-treated mineral oil can be obtained using standard petroleum refining procedures such as hydrocracking, hydrotreating, hydrofinishing and the like. Surprisingly, it has been found that limiting the grafting to the copolymer results in a product having superior dispersing power.

Suitable amines are those containing 1 to about 40 carbon atoms and 1 to about 6 amino nitrogen atoms. The amine reactant contains only one primary amine group. This prevents the amine from acting as a cross-linking agent between maleic grafted olefin copolymer. Any remaining amine nitrogen atoms in the amine reactant are secondary or tertiary amine nitrogen atoms.

Examples of suitable amines include methyl amine, N-butylamine, isobutyl amine, 2-ethylhexyl amine, N-dodecyl amine, oleylamine, N-(2-aminoethyl)morpholine, N-(2-aminoethyl) piperazine, N-(2-aminoethyl) piperidine, N,N-dimethyl-1,3-propane diamine, N-decyl ethylene diamine, N-dodecyl ethylenediamine, N-tetradecyl ethylenediamine, N-octadecyl ethylenediamine, N-octadecenyl ethylenediamine, N-dodecyl ethylenediamine, N-(dodecyl aminoethyl) ethylene diamine, N-(octadecenylaminoethyl) ethylene diamine, N-(docosyl aminoethyl) ethylenediamine, N-(triacontyl aminoethyl) ethylenediamine, N-(hexatriacontyl aminoethyl) ethylenediamine.

The preferred amines are substituted propanediamines having the structure

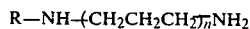

R—NH—(CH$_2$CH$_2$CH$_2$)$_n$NH$_2$ wherein R is an aliphatic hydrocarbon group containing about 12–33 carbon atoms and n is an integer from 1 to about 3. Examples of these are N-dodecyl-1,3-propanediamine, N-tetradecyl-1,3-propane diamine, N-octadecyl-1,3-propane diamine, N-triacontyl-1,3-propane diamine, N-(dodecylaminopropyl)-1,3-propane diamine, N-(octadecylaminopropyl)-1,3-propane diamine, N-(eicosylaminopropyl)-1,3-propane diamine, N-(octadecylaminopropyl)-1,3-propane diamine, N-(octadecylaminopropyl)-1,3-propane diamine, N-oleyl-1,3-propane diamine, N-9,12-octadecadienyl-1,3-propane diamine.

The amount of amine should be an amount which supplies at least 0.5 moles of amine per mole of succinic groups. More preferably, about 0.8–2 moles of amine are used per mole of succinic group.

The amidation can be conducted by merely mixing the amine with the grafted copolymer and heating the mixture to a temperature high enough to cause amidation. A useful temperature range is about 120° to about 170° C. A more preferred temperature range is 140° to 160° C.

In a more preferred embodiment, the succinic grafted copolymer is first esterified with an alkanol, e.g. C$_{1-10}$ alkanols such as methanol, ethanol, isobutanol, n-propanol, n-butanol, isobutanol, n-pentanol, 2-ethylhexanol, 2-ethyloctanol and the like. This converts all or most of the succinic groups to succinic esters or acid-esters. In this embodiment the amount of alkanol is preferably at least one mole per mole of succinic groups and more preferably about 1–2.5 moles per mole of succinic group.

The esterification reaction can be conducted under conditions known in the art to effect ester formation. A useful temperature range is about 100° to about 180° C.

Following this more preferred embodiment, the amine reactant is added as before. This mixture is heated to amidation temperature. The primary group is quite reactive and will displace most of the ester groups forming mixtures of amides and imides containing low amounts of ester groups. This ester displacement can be conducted at any temperature high enough to cause the reaction to proceed but not high enough to cause decomposition. A very effective way to conduct the reaction is to heat the mixture to a temperature sufficient to distill out displaced alkanol. At the end of the amidation, it is preferred that vacuum be applied to complete removal of displaced alkanol and water.

The following examples serve to illustrate how the products are made.

EXAMPLE 1

In a reaction vessel was placed 502 grams of hydrocracked bright stock and 20.2 grams of ethylene/propylene-1,4-hexadiene terpolymer (Ortholeum 2038, Trademark E. I. du Pont de Nemours and Company) having a molecular weight, $\overline{Mn}$, of about 68,000 and containing about 54 weight percent ethylene units, 43 weight percent propylene units, and 3 weight percent diene units. The terpolymer was cut into cubes and stirred in the oil at 200°–225° C. under nitrogen to form a solution. This required about three hours. The solution was cooled to 130° C. and 10 grams maleic anhydride was added. This was heated to 160° C. and 1.1 grams of 2,5-dimethyl-hex-3-yne-2,5-bis-tert-butylperoxide was added. Stirring was continued for an hour at 160° C. and then another 1.1 grams of catalyst was added. Stirring at 160° C. was continued for another hour. A 29-inch vacuum was applied and the mixture heated at 160° C. to distill a small amount of unreacted maleic anhydride, succinic anhydride and fumaric acid. A nitrogen stream was passed through the vessel to aid in removal. Then, 18 grams of 1-butanol was added and the mixture stirred at 120° C. Following this, 34 grams of N-oleylaminopropyl-1,3-propane diamine (Triamine T, Trademark, Armak Company) was added and the mixture distilled at 160° C. while passing a stream of nitrogen through it to remove displaced butanol and water. Then, 29 inches of vacuum was applied to complete butanol and water removal at 160° C. leaving a residual product that was an effective dispersant and VI improver in engine crankcase oil.

EXAMPLE 2

In a reaction vessel was placed 505.7 grams of hydrocracked 650 neutral oil and 33 grams Ortholeum 2038. This was dissolved at 230°–235° C. and then cooled to 160° C. Then, 7.5 grams of maleic anhydride and 0.8 grams of di-tert-butylperoxide were added and the mixture stirred at 155°–160° C. for 1.5 hours. The vessel was placed under 29 inches vacuum at 160° C. to remove fumaric acid. A nitrogen sweep was used to aid in removal. The solution was cooled to 130° C. and 10 ml. 1-butanol added. This was stirred at 130° C. for about 15 minutes at which time 23 grams of Triamine T was added. This was stirred at 160° C. for 30 minutes at which time pressure was reduced to distill off butanol and water leaving a viscous reddish liquid.

EXAMPLE 3

In a reaction vessel was placed 512 grams of hydrotreated 80 neutral oil and 50.6 grams of a copolymer having a molecular weight, $\overline{M}n$, of 39,000 and containing 54 weight percent ethylene units, 42 weight percent propylene units and 4 weight percent mixed 1,4-hexadiene and bicyclicdiene units (Ortholeum 2052 Trademark). The copolymer was dissolved at 230° C. under nitrogen and the solution cooled to 140° C. at which time 2.1 grams of maleic anhydride was added. The mixture was heated to 180° C. and 0.5 grams of 2,5-dimethyl-hex-3-yne-2,5-bis-tert-butylperoxide was added in increments over a 20-minute period. Stirring was continued at 180° C. for one hour. A nitrogen stream was passed through a reaction for one-half hour at 180° C. to remove fumaric acid. The mixture was cooled and 2.7 grams of 2-ethylhexanol was added. After stirring for about 15 minutes, 8.0 grams of Triamine T was added at 120° C. Stirring was continued for 1.5 hours at 160° C. while passing through a stream of nitrogen to remove water. The residual product was an effective dispersant VI improver.

EXAMPLE 4

This reaction was conducted substantially the same as in Example 3 using 1587.8 grams hydrotreated 80 neutral oil, 157.2 grams Ortholeum 2052, 6.5 grams maleic anhydride, 1.8 ml. peroxide catalyst to form a succinic grafted copolymer intermediate. Then 564.5 grams of the intermediate was reacted with 2.7 grams 2-ethyl hexanol and 8 grams Triamine T. After removing water and alcohol a pale amber liquid product was obtained.

For comparative purposes, the following two examples were conducted in a mineral oil solvent that was not hydrogentreated.

EXAMPLE 5

In a reaction vessel was placed 512 grams of 110 neutral oil (not hydrotreated) and 50.6 grams Ortholeum 2052. The copolymer was dissolved at 230° C. The solution was cooled and 2.1 grams of maleic anhydride was added at 160° C. The stirred mixture was heated to 180° C. and 0.5 grams of peroxide catalyst was added over a 24-minute period. Stirring for an additional hour at 180° C. was continued, following which the solution was sparged with nitrogen for 30 minutes at 180° C. to remove volatiles, then, 1.7 grams of 2-ethyl hexanol was added and the solution cooled to 120° C. over a one-hour period. Then eight grams of Triamine T was added and the solution heated to 160° C. and stirred for one hour. Water and alcohol were removed by sparging with nitrogen. The product was cooled to 130° C. and filtered through a fine screen to obtain a liquid product.

EXAMPLE 6

This example was conducted substantially the same as Example 5 to obtain 571.9 grams of liquid product.

The effectiveness of the additive as a lubricating oil dispersant was measured using a bench dispersancy test. In this test, an asphaltene sludge was made by air oxidation of 100 neutral oil using an iron naphthenate catalyst. The oxidized oil containing precipitated sludge was diluted with heptane to dissolve part of the sludge which was filtered off. The sludge saturated heptane diluted filtrate stabilized with a small amount of butanol was used as the test sludge.

The test was conducted by mixing 1 ml. of sludge solution into 10 ml. 100 neutral mineral oil containing various amounts of test additives. The test samples were left standing for 16+ hours and then rated visually. The least effective dispersant resulted in a precipitate (PPT). Improvement was in the order of heavy haze (HH), medium haze (MH), light haze (LH), and trace haze (TH). The best dispersant activity resulted in a clear sample with no precipitate.

The following table shows the performance of various additives at different concentrations.

| Additive of Example | Additive Concentration (percent) | | | |
|---|---|---|---|---|
| | 0.125 | 0.25 | 0.5 | 1.0 |
| 1 | PPT | MH | LH | Clear |
| 2 | HH | MH | LH | TH |
| 3 | PPT | HH | LH | TH |
| 4 | PPT | MH | LH | TH |
| 5 | PPT | PPT | HH | MH |
| 6 | PPT | PPT | MH | TH |

These results show that the additives of Examples 1–4 were quite effective at concentrations as low as 0.5 percent. However, the additive of Examples 5 and 6 made using non-hydrotreated mineral oil required twice the concentration to achieve the same degree of effectiveness.

The additives are used in lubricating oil at a concentration which achieves the desired level of dispersancy and VI improvement. They may also independently be used in combination with non-dispersant VI improvers to achieve desired levels. This can usually be accomplished by adding about 0.2 to about 2.0 weight percent of effective ingredient to the oil. In other words, 10 weight percent of a 10 weight percent active oil solution of additive would add about one weight percent additive.

The additives can be used in mineral oil or in synthetic oils of viscosity suitable for use in the crankcase of an internal combustion engine. Crankcase lubricating oils have a viscosity up to about 80 SUS at 210° F.

Crankcase lubricating oils of the present invention have a viscosity up to about SAE 40. Sometimes such motor oils are given a classification at both 0° and 210° F., such as SAE 10W 40 or SAE 5W 30.

Mineral oils include those of suitable viscosity refined from crude oil from all sources including Gulfcoast, midcontinent, Pennsylvania, California, Alaska and the like. Various standard refinery operations can be used in processing the mineral oil.

Synthetic oil includes both hydrocarbon synthetic oil and synthetic esters. Useful synthetic hydrocarbon oils include liquid polymers of α-olefins having the proper viscosity. Especially useful are the hydrogenated liquid oligomers of $C_{6-12}$ α-olefins such as α-decene trimer. Likewise, alkylbenzenes of proper viscosity can be used, such as didodecylbenzene.

Useful synthetic esters include the esters of both monocarboxylic acid and polycarboxylic acid as well as monohydroxy alkanols and polyols. Typical examples are didodecyl adipate, trimethylol propane tripelargonate, pentaerythritol tetracaproate, di-(2-ethylhexyl)adipate, dilauryl sebacate and the like. Complex esters prepared from mixtures of mono- and dicarboxylic acid and mono- and polyhydroxyl alkanols can also be used.

Blends of mineral oil with synthetic oil are particularly useful. For example, blends of 10-25 weight percent hydrogenated α-decene trimer with 75-90 weight percent 150 SUS (100° F.) mineral oil results in an excellent lubricant. Likewise, blends of about 10-25 weight percent di-(2-ethylhexyl)adipate with mineral oil of proper viscosity results in a superior lubricating oil. Also blends of synthetic hydrocarbon oil with synthetic esters can be used. Blends of mineral oil with synthetic oil are especially useful when preparing low viscosity oil (e.g. SAE 5W 20) since they permit these low viscosities without contributing excessive volatility.

The more preferred lubricating oil composition includes zinc dihydrocarbyldithiophosphate (ZDDP) in combination with the present additives. Both zinc dialkyldithiophosphates and zinc dialkaryldithiophosphates as well as mixed alkyl-aryl ZDDP are useful. A typical alkyl-type ZDDP contains a mixture of isobutyl and isoamyl groups. Zinc di-(nonylphenyl)dithiophosphate is a typical aryl-type ZDDP. Good results are achieved using sufficient ZDDP to provide about 0.01-0.5 weight percent zinc. A preferred concentration supplies about 0.05-0.3 weight percent zinc.

Another additive used in the oil compositions are the alkaline earth metal petroleum sulfonates or alkaline earth metal alkaryl sulfonates. Examples of these are calcium petroleum sulfonates, magnesium petroleum sulfonates, barium alkaryl sulfonates, calcium alkaryl sulfonates or magnesium alkaryl sulfonates. Both the neutral and the overbased sulfonates having base numbers up to about 400 can be beneficially used. These are used in an amount to provide about 0.05-1.5 weight percent alkaline earth metal and more preferably about 0.1-1.0 weight percent. In a most preferred embodiment the lubricating oil composition contains a calcium petroleum sulfonate or alkaryl (e.g. alkylbenzene) sulfonate.

Other viscosity index improvers can be included such as the polyalkylmethacrylate type or the ethylene-propylene copolymer type. Likewise, styrene-diene VI improvers or styrene-acrylate copolymers can be used. Alkaline earth metal salts of phosphosulfurized polyisobutylene are useful.

Most preferred crankcase oils also contain supplemental ashless dispersant such as the polyolefin-substituted succinamides and succinimides of polyethylene polyamines such as tetraethylenepentamine. The polyolefin succinic substituent is preferably a polyisobutene group having a molecular weight of from about 800 to 5,000. Such ashless dispersants are more fully described in U.S. Pat. Nos. 3,172,892 and 3,219,666, incorporated herein by reference.

Another useful class of ashless dispersants are the polyolefin succinic esters of mono- and polyhydroxy alcohols containing 1 to about 40 carbon atoms. Such dispersants are described in U.S. Pat. Nos. 3,381,022 and 3,522,179.

Likewise, mixed ester/amides of polyolefin substituted succinic acid made using alkanols, amines and/or aminoalkanols represents a useful class of ashless dispersants.

The succinic amide, imide and/or ester type ashless dispersants may be boronated by reaction with a boron compound such as boric acid. Likewise, the succinic amide, imide, and/or ester may be oxyalkylated by reaction with an alkylene oxide such as ethylene oxide or propylene oxide.

Other useful ashless dispersants include the Mannich condensation products of polyolefin-substituted phenols, formaldehyde and polyethylene polyamine. Preferably, the polyolefin phenol is a polyisobutylene-substituted phenol in which the polyisobutylene group has a molecular weight of from about 800 to 5,000. The preferred polyethylene polyamine is tetraethylene pentamine. Such Mannich ashless dispersants are more fully described in U.S. Pat. Nos. 3,368,972; 3,413,347; 3,442,808; 3,448,047; 3,539,633; 3,591,598; 3,600,372; 3,634,515; 3,697,574; 3,703,536; 3,704,308; 3,725,480; 3,726,882; 3,736,357; 3,751,365; 3,756,953; 3,792,202; 3,798,165; 3,798,247 and 3,803,039.

VI improvers are usually not compatible with additive concentrates and are added separately to the oil blend.

We claim:

1. An oil soluble viscosity index improver having dispersant properties adapted for use in lubricating oil, said viscosity index improver being a product made by a process comprising
   (a) dissolving an ethylene/α-olefin copolymer containing up to 10 weight percent non-conjugated diene monomer units in a hydrogen-treated mineral oil solvent, said copolymer having an average molecular weight of about 1000-500,000,
   (b) reacting the resultant copolymer solution with maleic acid, anhydride, or acid ester in the presence of a free radical-producing catalyst, thereby grafting succinic groups to said copolymer to form an intermediate, and
   (c) reacting said intermediate with an aliphatic hydrocarbyl amine having the structure

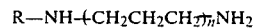
   $$R-NH+CH_2CH_2CH_2)_n NH_2$$

wherein R is an aliphatic hydrocarbon group containing about 12-33 carbon atoms and n is an integer from 1 to about 3, in an amount sufficient to provide at least one primary amine group for each of said succinic groups.

2. A viscosity index improver of claim 1 wherein maleic anhydride is reacted with said ethylene/α-olefin copolymer in Step (b) and the resultant intermediate is reacted with at least one mole of a $C_{1-10}$ monohydroxy alcohol per mole of said succinic groups to form an acid-ester intermediate and then subjecting said acid-ester intermediate to Step (c) while distilling out alcohol displaced by said amine.

3. A viscosity index improver of claim 1 wherein R is a $C_{18}$ aliphatic hydrocarbon group and n is 1.

4. A viscosity index improver of claim 1 wherein R is a $C_{18}$ aliphatic hydrocarbon group and n is 2.

5. A viscosity index improver of claim 1 wherein maleic anhydride is reacted with said ethylene/α-olefin copolymer in Step (b) and the resultant intermediate is reacted with at least one mole of a $C_{1-10}$ monohydroxy alcohol per mole of said succinic groups to form an acid-ester intermediate and then subjecting said acid-ester intermediate to Step (c) while distilling out alcohol displaced by said amine.

6. A viscosity index improver of claim 1 wherein said copolymer contains about 30 to 80 weight percent ethylene units and 20 to 70 weight percent propylene units.

7. A viscosity index improver of claim 6 wherein said copolymer of ethylene and propylene is further characterized by containing 1–10 weight percent of units derived from at least one non-conjugated diene.

8. A viscosity index improver of claim 7 wherein said non-conjugated diene is 1,4-hexadiene.

9. A viscosity index improver of claim 8 made by the process comprising
 (i) dissolving said ethylene/propylene/1,4-hexadiene copolymer in hydrogen-treated mineral oil to form a solution containing about 1–15 weight percent copolymer,
 (ii) reacting said copolymer solution with about 0.2 to 10 weight percent of maleic anhydride based on the weight of said copolymer in the presence of a free radical-producing catalyst, thereby grafting succinic groups to said copolymer to form an oil solution of an intermediate, and
 (iii) reacting said oil solution of an intermediate with about 0.8–2 moles per mole of said succinic groups of a primary amine having the structure

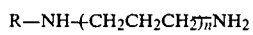

wherein R is an aliphatic hydrocarbon group containing about 12–33 carbon atoms and n is an integer from 1 to about 3.

10. A viscosity index improver of claim 7 wherein said non-conjugated diene comprises 1,4-hexadiene in combination with ethylidene norbornene or dicyclopentadiene.

11. A viscosity index improver of claim 9 wherein said oil solution of an intermediate formed in Step (ii) is reacted with at least one mole of $C_{1-10}$ monohydroxy alcohol per mole of said succinic groups to form an oil solution of an acid-ester intermediate and then subjecting said oil solution of an acid-ester intermediate to Step (iii) while distilling out alcohol displaced by said amine.

12. A viscosity index improver of claim 11 wherein R is a $C_{18}$ aliphatic hydrocarbon group and n is 2.

13. A process for making an oil soluble viscosity index improver having dispersant properties, said process comprising
 (a) dissolving an ethylene/α-olefin copolymer containing up to 10 weight percent non-conjugated diene monomer units in a hydrogen-treated mineral oil solvent, said copolymer having an average molecular weight of about 1000–500,000,
 (b) reacting the resultant copolymer solution with maleic acid, anhydride, or acid ester in the presence of a free radical-producing catalyst, thereby grafting succinic groups to said copolymer to form an intermediate,
 (c) reacting the resultant intermediate with at least one mole of $C_{1-10}$ monohydroxy alcohol per mole of said succinic groups to form an acid-ester intermediate, and then
 (d) reacting said acid-ester with an aliphatic hydrocarbyl amine having the structure

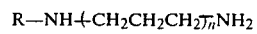

wherein R is an aliphatic hydrocarbon group containing about 12–33 carbon atoms and n is an integer from 1 to about 3, in an amount sufficient to provide at least one primary amine group for each of said succinic groups, while distilling out alcohol displaced by said amine.

14. A process of claim 13 wherein said copolymer is a copolymer containing about 30—80 weight percent ethylene units, 20–70 weight percent propylene units and 0–10 weight percent non-conjugated diene units.

15. A process of claim 14 wherein said copolymer contains 1–10 weight percent non-conjugated diene units, derived from 1,4-hexadiene.

16. A lubricating oil composition comprising a major amount of oil of lubricating viscosity and a minor dispersant amount of an oil soluble additive having dispersant and viscosity index improving properties, said additive being the product made by a process comprising
 (a) dissolving an ethylene/α-olefin copolymer containing up to 10 weight percent non-conjugated diene monomer units in a hydrogen-treated mineral oil solvent, said copolymer having an average molecular weight of about 1000–500,000,
 (b) reacting the resultant copolymer solution with maleic acid, anhydride, or acid ester in the presence of a free radical-producing catalyst, thereby grafting succinic groups to said copolymer to form an intermediate,
 (c) reacting the resultant intermediate with at least one mole of $C_{1-10}$ monohydroxy alcohol per mole of said succinic groups to form an acid-ester intermediate, and then
 (d) reacting said acid-ester with an aliphatic hydrocarbyl amine having the structure

wherein R is an aliphatic hydrocarbon group containing about 12–33 carbon atoms and n is an integer from 1 to about 3, in an amount sufficient to provide at least one primary amine group for each of said succinic groups, while distilling out alcohol displaced by said amine.

* * * * *

UNITED STATES PATENT AND TRADEMARK OFFICE
CERTIFICATE OF CORRECTION

PATENT NO. : 4,505,834
DATED : March 19, 1985
INVENTOR(S) : ANDREW G. PAPAY ET AL.

It is certified that error appears in the above-identified patent and that said Letters Patent is hereby corrected as shown below:

Column 3, line 42, "$R-NH-(CH_2CH_2CH_2)_n-NH_2$" should read
-- $R-(NH-CH_2CH_2CH_2)_n-NH_2$ --.

Column 8, line 38, "$R-NH-(CH_2CH_2CH_2)_n-NH_2$" should read
-- $R-(NH-CH_2CH_2CH_2)_n-NH_2$ --.

Column 9, line 25, "$R-NH-(CH_2CH_2CH_2)_n-NH_2$" should read
-- $R-(NH-CH_2CH_2CH_2)_n-NH_2$ --.

Column 10, line 10, "$R-NH-(CH_2CH_2CH_2)_n-NH_2$" should read
-- $R-(NH-CH_2CH_2CH_2)_n-NH_2$ --.

Column 10, line 46, "$R-NH-(CH_2CH_2CH_2)_n-NH_2$" should read
-- $R-(NH-CH_2CH_2CH_2)_n-NH_2$ --.

Signed and Sealed this

Eighth Day of October 1985

[SEAL]

Attest:

*Attesting Officer*

DONALD J. QUIGG

*Commissioner of Patents and Trademarks—Designate*